(12) United States Patent
Yoon et al.

(10) Patent No.: US 11,564,554 B2
(45) Date of Patent: Jan. 31, 2023

(54) DISHWASHER WITH HEAT PUMP

(71) Applicant: LG Electronics Inc., Seoul (KR)

(72) Inventors: Sangheon Yoon, Seoul (KR);
Changyoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 16/698,255

(22) Filed: Nov. 27, 2019

(65) Prior Publication Data
US 2020/0163528 A1    May 28, 2020

(30) Foreign Application Priority Data
Nov. 28, 2018    (KR) .......................... 10-2018-0150015

(51) Int. Cl.
*A47L 15/42*    (2006.01)
*A47L 15/00*    (2006.01)

(52) U.S. Cl.
CPC ....... *A47L 15/4285* (2013.01); *A47L 15/0031* (2013.01); *A47L 15/4214* (2013.01); *A47L 15/4287* (2013.01)

(58) Field of Classification Search
CPC .............................................. A47L 15/00–508
See application file for complete search history.

(56) References Cited

U.S. PATENT DOCUMENTS

| 3,049,133 | A | * | 8/1962 | Jacobs ................ A47L 15/4234 134/107 |
| 4,315,140 | A | * | 2/1982 | Helwig, Jr. ......... A47L 15/0047 219/486 |
| 5,601,660 | A | * | 2/1997 | Jeon .................... A47L 15/4206 134/104.4 |
| 2008/0011339 | A1 | * | 1/2008 | Ryu .................... A47L 15/4244 134/56 D |

(Continued)

FOREIGN PATENT DOCUMENTS

| CH | 699692 B1 * | 9/2013 | ......... A47L 15/4291 |
| CN | 101440998 A * | 5/2009 | |

(Continued)

OTHER PUBLICATIONS

J.M.K.C. Donev et al. (2018). Energy Education—Heat pump [Online], Available: https://energyeducation.ca/encyclopedia/Heat_pump. [Accessed: Jun. 9, 2021], (Year: 2018).*

(Continued)

*Primary Examiner* — Spencer E. Bell
*Assistant Examiner* — Omair Chaudhri
(74) *Attorney, Agent, or Firm* — Fish & Richardson P.C.

(57) ABSTRACT

The present disclosure relates to a dishwasher having a heat pump, including a dishwasher body provided with a tub configured with a washing space therein and a sump provided at a bottom of the tub to temporarily accommodate washing water; a heat pump having a compressor, an evaporator, an expansion apparatus, and a sump condenser pro- (Continued)

vided inside the sump to exchange heat with washing water inside the sump; and a controller that controls the heat pump to be driven so as to increase the temperature of the washing water inside the sump. As a result, a heating time of washing water may be shortened, thereby suppressing washing time from being prolonged.

19 Claims, 10 Drawing Sheets

(56) References Cited

U.S. PATENT DOCUMENTS

| | | | | |
|---|---|---|---|---|
| 2008/0190464 A1* | 8/2008 | Stahlmann | A47L 15/4204 | 134/110 |
| 2013/0305747 A1* | 11/2013 | Krische | D06F 58/206 | 62/79 |
| 2014/0041695 A1* | 2/2014 | Ellingson | A47L 15/0047 | 134/105 |
| 2014/0069473 A1* | 3/2014 | Baldwin | A47L 15/4219 | 134/56 D |
| 2014/0261576 A1* | 9/2014 | Lee | A47L 15/42 | 134/111 |
| 2015/0201466 A1* | 7/2015 | Sclip | G01F 23/292 | 219/209 |
| 2015/0337859 A1* | 11/2015 | Qi | F04D 29/426 | 415/177 |
| 2017/0027404 A1* | 2/2017 | Anim-Mensah | A47L 15/0015 | |
| 2017/0051953 A1* | 2/2017 | Dreossi | A47L 15/0047 | |
| 2017/0143181 A1* | 5/2017 | Spång | A47L 15/0018 | |
| 2018/0028042 A1* | 2/2018 | Heinle | A47L 15/46 | |
| 2020/0187749 A1* | 6/2020 | Bertram | A47L 15/4297 | |

FOREIGN PATENT DOCUMENTS

| | | | | |
|---|---|---|---|---|
| DE | 3048268 A1 * | 7/1982 | | F25B 29/003 |
| DE | 102011084119 | 11/2016 | | |
| DE | 102015226481 | 6/2017 | | |
| EP | 1386575 B1 * | 10/2005 | | A47L 15/4206 |
| EP | 2810595 A1 * | 12/2014 | | A47L 15/4285 |
| EP | 3082554 B1 * | 10/2017 | | A47L 15/4291 |
| EP | 3082555 B1 * | 12/2017 | | A47L 15/4291 |
| KR | 100770071 | 10/2007 | | |
| KR | 101037921 | 5/2011 | | |

OTHER PUBLICATIONS

Engineering Tool Box, (2003). Convective Heat Transfer, [online] Available at: https://www.engineeringtoolbox.com/convective-heat-transfer-d_430.html (Year: 2003).*

Office Action in German Appln. No. 102019131958.7, dated Mar. 8, 2022, 22 pages (with English translation).

* cited by examiner

DISHWASHER WITH HEAT PUMP

CROSS-REFERENCE TO RELATED APPLICATIONS

Pursuant to 35 U.S.C. § 119(a), this application claims the benefit of earlier filing date and right of priority to Korean Application No. 10-2018-0150015, filed on Nov. 28, 2018, the contents of which is incorporated by reference herein in its entirety.

TECHNICAL FIELD

The present disclosure relates to a dishwasher having a heat pump.

BACKGROUND

As is known, dishwasher is a type of appliance that cleans dishes and/or cooking utensils using detergent and washing water. Such a dishwasher includes a dishwasher body typically configured with a washing space therein and a door that opens and closes the washing space.

The dishwasher body includes a rack for accommodating and supporting dishes, a spray arm for spraying washing water to the rack, a supply pump for supplying washing water to the spray arm, and a drain pump for draining the washing water of the sump to an outside of the dishwasher body.

The dishwasher includes various washing courses including some or all of pre-washing, washing, rinsing, heating rinsing and drying processes.

On the other hand, the dishwasher body is provided with a heating unit for heating the washing water. The heating unit, for example, is composed of an electric heater for generating heat when power is applied to heat washing water.

However, in a dishwasher in the related art, washing water is heated using an electric heater, and thus there is a problem that a relatively large amount of power is consumed when washing water is heated. Furthermore, washing water heated to wash dishes is discharged to an outside of the dishwasher in a state having a high temperature (energy), and thus there is a problem that energy loss occurs.

In consideration of this problem, some of the dishwashers are designed to have a waste heat recovery device for recovering the waste heat of the dishwasher using a heat pump to heat water supply, and some of the other dishwashers are designed to arrange a condenser of the heat pump on a bottom surface of a cleaning tank to heat washing water inside the cleaning tank.

However, in a waste heat recovery device of a dishwasher using such a heat pump, in order to recover heat from washing water discharged from a dishwasher, a plurality of heat exchange apparatuses and a long passage for the movement of washing water are configured separately from the dishwasher, and thus there is a problem that the number of parts for heating of washing water and waste heat recovery and the size thereof are increased and the configuration and control thereof are complicated.

In addition, washing water to be supplied is heated using the heat of the washing water discharged after a washing process or after a rinsing process, and thus there is a problem that the washing water to be supplied cannot be preheated before the washing process. Due to this, there is a problem that it takes a relatively long time to heat washing water.

Moreover, in a dishwasher arranged with a condenser under a cleaning tank to heat washing water inside the cleaning tank, the cleaning tank should be configured to be withdrawable from the dishwasher body to the outside, and thus a clearance for withdrawing the cleaning tank is generated between the condenser and the cleaning tank, and as a result, there is a problem that heat exchange between the condenser and the washing water of the cleaning tank is insufficient and the operating efficiency of the heat pump is deteriorated.

Besides, the cleaning tank is accommodated inside the dishwasher body, and then a washing tank inside the cleaning tank is heated by the condenser after water is supplied to an inside of the cleaning tank, and thus there is a problem that a relatively long time is required to heat the washing water inside the cleaning tank.

PRIOR ART DOCUMENTS

Patent Documents (Patent Document 1) KR10-1037921 B1
(Patent Document 2) KR10-0770071 B1

SUMMARY

An aspect of the present disclosure is to provide a dishwasher having a heat pump capable of shorten the heating time of washing water to suppress washing time from being prolonged.

Furthermore, another aspect of the present disclosure is to provide a dishwasher having a heat pump capable of suppressing heat loss from being generated during the heating of washing water.

In addition, still another aspect of the present disclosure is to provide a dishwasher having a heat pump capable of eliminating the use of an additional heat exchange apparatus for heating washing water.

Moreover, yet still another aspect of the present disclosure is to provide a dishwasher having a heat pump capable of selectively heating washing water required for a current process in a previous process and the current process to shorten the washing time.

In order to achieve the foregoing objectives, the present disclosure a dishwasher having a heat pump, including a dishwasher body provided with a tub configured with a washing space therein and a sump provided at a bottom of the tub to temporarily accommodate washing water; a heat pump having a compressor, an evaporator, an expansion apparatus, and a sump condenser provided inside the sump to exchange heat with washing water inside the sump; and a controller that controls the heat pump to be driven so as to increase the temperature of the washing water inside the sump.

According to an embodiment, the sump may have an upwardly open cylindrical shape, and the sump condenser may have a coil shape.

According to an embodiment, the sump may have a conical cross section the inner diameter of which is gradually reduced toward the lower side, and the sump condenser may have a shape corresponding to an inner shape of the sump.

According to an embodiment, the sump may include a first filter disposed to block an opening of the sump; and a second filter provided at an inner side of the sump condenser below the first filter to suppress the access of contaminants from the inner side of the sump condenser.

According to an embodiment, the second filter may be upwardly open, and the sump may further include a third filter coupled to block an upper opening of the second filter.

Here, the first filter may have a plurality of through holes, and the second filter may have a plurality of meshes, and a size of each of the meshes of the second filter may be defined smaller than that of each of the through holes of the first filter.

Furthermore, the third filter may have a plurality of through portions, and a size of each of the plurality of through portions of the third filter may be defined greater than that of each of the through holes of the first filter. According to an embodiment, the dishwasher body may further include a water jacket that stores washing water therein, wherein the heat pump further comprises a water jacket condenser provided inside the water jacket to heat washing water inside the water jacket.

According to an embodiment, the heat pump may further include a refrigerant passage switching valve, one end of which is connected to the compressor and the other end of which is connected to the sump condenser and the water jacket condenser, respectively, to switch a passage of refrigerant, and the controller may control the refrigerant passage switching valve to heat the washing water of the water jacket first prior to heating the washing water of the sump, and supply refrigerant to the water jacket condenser.

According to an embodiment, the water jacket may be provided with a water pipe that supplies washing water and a water valve that opens and closes the water pipe, and the controller may control the water valve to open the water pipe so as to supply a predetermined amount of washing water to the water jacket prior to supplying refrigerant to the water jacket condenser.

According to an embodiment, the water jacket may be provided with a water jacket temperature sensing unit that senses the temperature of washing water of the water jacket, and the controller may control the heat pump to stop the supply of the refrigerant to the water jacket condenser when the temperature of the washing water of the water jacket reaches a preset temperature as a sensing result of the water jacket temperature sensing unit.

According to an embodiment, the dishwasher may further include an electric heater that heats the washing water of the sump; and a temperature sensing unit that senses a temperature of the washing water of the sump, wherein the controller compares a temperature of the washing water of the sump sensed by the temperature sensing unit with a preset temperature when a preset period of time elapses, and controls the electric heater to generate heat when the temperature of the washing water of the sump is less than the preset temperature.

The sump may be connected to a circulation pump that circulates the washing water of the sump, and the electric heater and the temperature sensing unit may be provided inside the circulation pump.

According to an embodiment, the compressor and the evaporator are provided to exchange heat in the same space inside the dishwasher body.

According to an embodiment, the evaporator may be provided to exchange heat with water inside the water tank at an inside of the water tank.

Here, the water tank may be provided with a water pipe that supplies water into the water tank.

The water pipe may be provided with a water pipe open-close valve that opens and closes an internal passage of the water pipe, and the water tank may be provided with a water level sensing unit that senses a level of water, and the controller may control the water pipe open-close valve based on a sensing result of the water level sensing unit of the water tank.

The water tank may be provided at an upper side of the compressor.

A heat transfer member that transfers the heat energy of the compressor to the water tank may be provided between the water tank and the compressor.

The heat transfer member may be provided to circulate water therein.

The heat transfer member may be provided with a heat exchange unit configured to heat exchange on a circumferential surface of the compressor.

Both end portions of the heat transfer member are connected to be spaced apart vertically with a height difference from each other on a side surface of the water tank.

As described above, according to an embodiment of the present disclosure, a sump condenser may be provided inside a sump to directly heat washing water inside the sump so as to reduce the heating time of the washing water, thereby suppressing the washing time from being prolonged.

Furthermore, the sump condenser may heat washing water in direct contact with the washing water inside the sump, thereby suppressing heat loss from being generated while heating the washing water.

In addition, the sump condenser may be provided inside the sump, thereby eliminating the use of an additional heat exchange apparatus for heating washing water.

Moreover, a water jacket condenser may be provided to heat washing water inside a water jacket capable of storing washing water to heat washing water required for a subsequent process in advance in a current process, thereby shortening the heating time of the washing water.

Besides, the sump condenser may be provided inside the sump, and the water jacket condenser may be provided inside the water jacket to selectively heat washing water required for a current process in a previous process and the current process, thereby significantly reducing the washing time.

Furthermore, an electric heater capable of heating the washing water of the sump may be provided, and the washing water of the sump may be heated by the electric heater when the heating time of the washing water is excessively increased due to the efficiency of the heat pump, thereby suppressing the washing time of dishes from being excessively prolonged due to the deterioration of the efficiency of the heat pump.

In addition, the sump condenser inside the sump may be disposed between a first filter and a second filter, thereby suppressing contaminants from coming into the sump condenser to suppress the contamination generation of the sump condenser.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure.

DETAILED DESCRIPTION

Hereinafter, preferred embodiments disclosed in the present disclosure will be described in detail with reference to the accompanying drawings. Even in different embodiments according to the present disclosure, the same or similar reference numerals are designated to the same or similar configurations, and the description thereof will be substituted by the earlier description. A singular representation used in the present disclosure may include a plural representation as far as it represents a definitely different meaning from the context. In describing the embodiments disclosed herein, moreover, the detailed description will be omitted when specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

Figure 1:
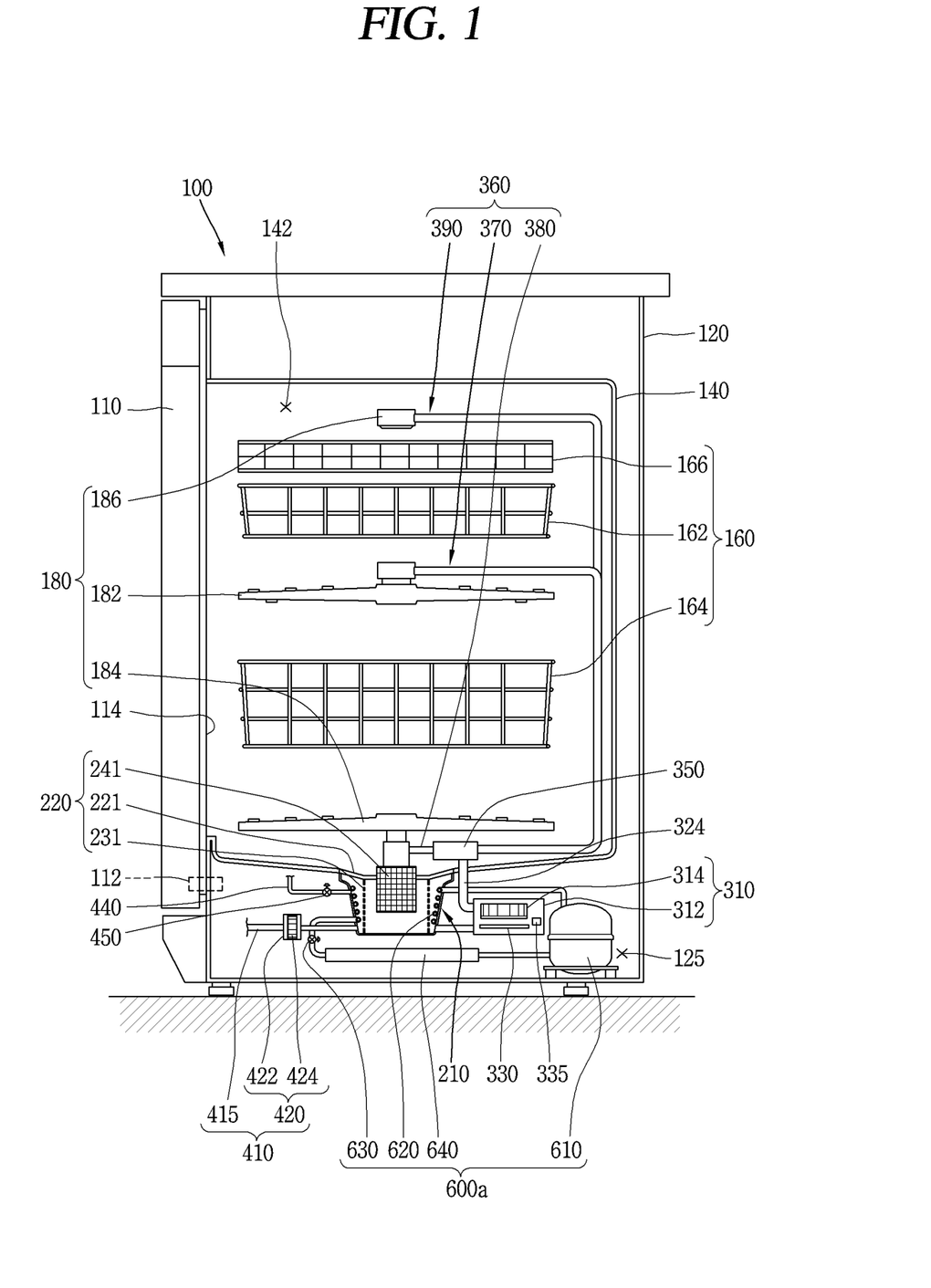
FIG. 1 is a cross-sectional view of a dishwasher having a heat pump according to an embodiment of the present disclosure.
Figure 2:
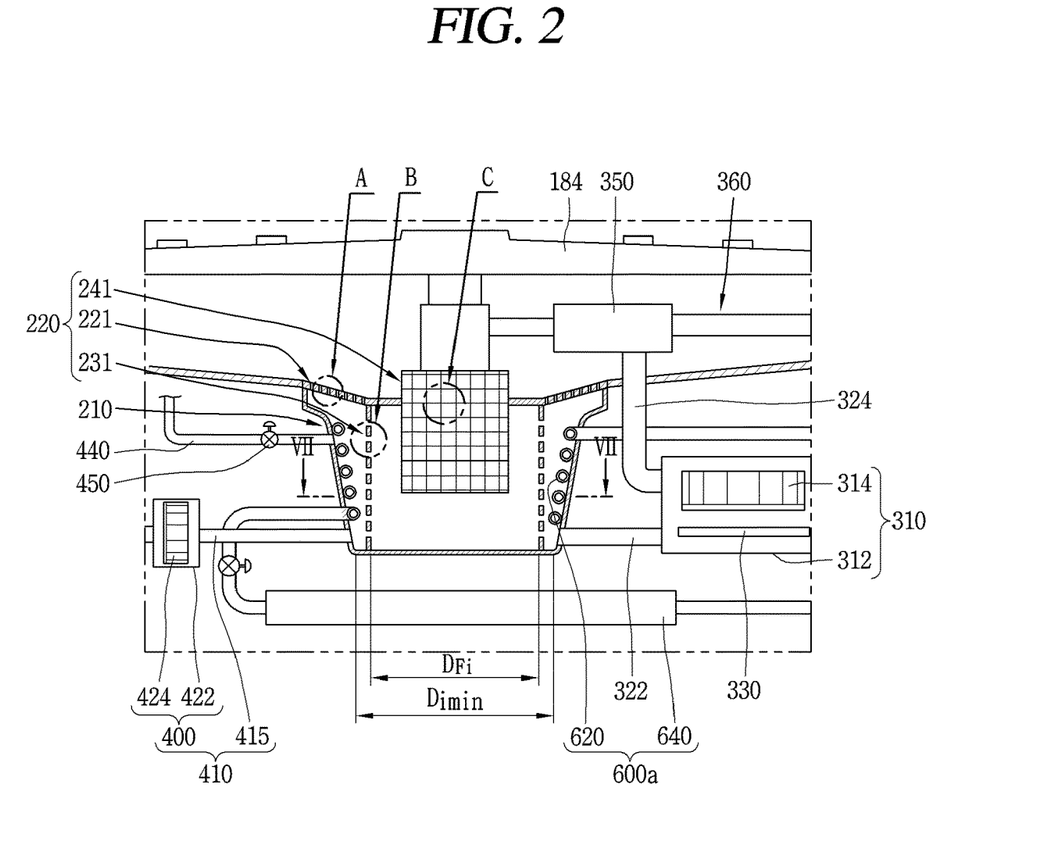
FIG. 2 is a partially enlarged view of FIG. 1.
Figure 3:
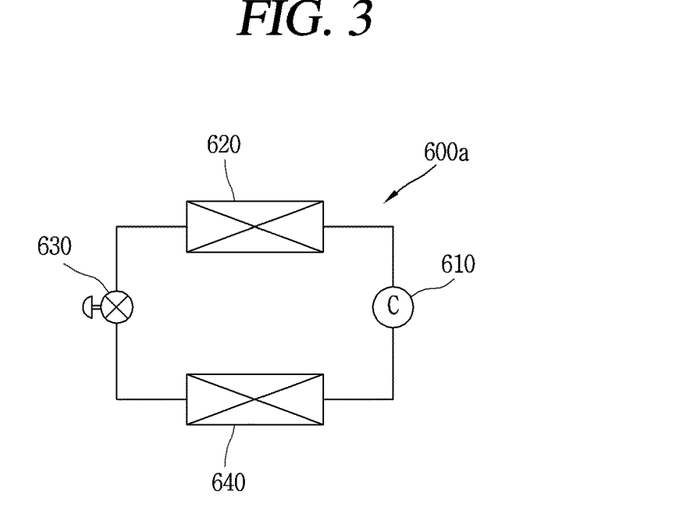
FIG. 3 is a cycle diagram of the heat pump in FIG. 1.

FIG. 1 is a cross-sectional view of a dishwasher having a heat pump according to an embodiment of the present disclosure, and FIG. 2 is a partially enlarged view of FIG. 1, and FIG. 3 is a cycle diagram of the heat pump in FIG. 1. As illustrated in FIGS. 1 and 2, a dishwasher according to an embodiment of the present disclosure includes a dishwasher body 100 provided with a washing space 142 and a door 110 that opens and closes the washing space 142. The dishwasher body 100 includes a cabinet 120 forming an appearance. The cabinet 120 is implemented in a substantially rectangular parallelepiped shape. A tub 140 is provided inside the cabinet 120. A washing space 142 is disposed inside the tub 140. The tub 140 has a front opening. The door 110 rotates vertically around a hinge 112 provided at the bottom. The door 110 hermetically blocks the front opening of the tub 140. A gasket 114 is provided between the dishwasher body 100 and the door 110.

The rack 160 for accommodating dishes is provided inside the washing space 142. A plurality of racks 160 are provided therein. The plurality of racks 160 include an upper rack 162 provided above the washing space 142. The plurality of racks 160 include a lower rack 164 provided below the washing space 142. The plurality of racks 160 include a top rack 166 provided at an upper side of the upper rack 162.

An inside of the washing space 142 is provided with a spray arm 180 for spraying washing water. A plurality of spray arms 180 are implemented to be disposed along a vertical direction of the washing space 142. The spray arm 180 has an upper spray arm 182 disposed above the washing space 142. The upper spray arm 182 is installed below the upper rack 162. The upper spray arm 182 is configured to spray washing water toward the upper rack 162. The spray arm has a lower spray arm 184 provided below the washing space 142. The lower spray arm 184 is configured to spray washing water toward the lower rack 164. The spray arm has a top spray arm 186 for spraying washing water toward the top rack 166. The top spray arm 186 may be disposed above the top rack 166.

The bottom of the tub 140 is provided with a sump 210 for collecting washing water. A bottom surface of the tub 140 is configured to be inclined. The sump 210 is configured to be open upward. The sump 210 is, for example, configured to have a conical cross section the inner diameter of which decreases toward the lower side. The sump 210 is disposed such that the upper opening corresponds to a lower region of the bottom surface of the tub 140. As a result, washing water inside the tub 140 may be collected into the sump 210 through the upper opening of the sump 210. One side of the sump 210 is connected to a connection pipe 440 for supplying washing water. The connection pipe 440 is provided with an open-close valve 450 that opens and closes the passage therein. Another side of the sump 210 is connected to a circulation pump 310 for circulating the washing water of the sump 210.

The circulation pump 310 has a housing 312 and an impeller 314 rotatably provided inside the housing 312. A suction pipe 322 is connected to one side of the housing 312. An electric heater 330 is provided inside the housing 312 to heat washing water. The inside of the housing 312 is provided with a temperature sensor 335 for sensing the temperature of washing water. In the present embodiment, it is illustrated a case in which the electric heater 330 is provided inside the circulation pump 310, but the electric heater 330 may be provided in the sump 210. In addition, the electric heater 330 may not be installed in the circulation pump 310 and may not be installed in the sump 210. Hereinafter, a case in which the electric heater 330 is installed inside the circulation pump 310 will be described as an example. A discharge pipe 324 is connected to the other side of the housing 312. A passage switching valve 350 is connected to the discharge pipe 324.

The passage switching valve 350 is connected to a washing water guide 360 for guiding washing water. The washing water guide 360 includes an upper guide 370 connected to the upper spray arm 182, a lower guide 380 connected to the lower spray arm 184, and a top guide 390 connected to the top rack 166. The other side of the sump 210 is configured with a drain unit 410. The drain unit 410 has a drain passage 415 through which the washing water of the sump 210 is drained, and a drain pump 420 provided in the drain passage 415. The drain pump 420 has a housing 422 and an impeller 424 rotatably installed inside the housing 422.

The dishwasher body 100 includes a heat pump 600a for heating washing water. As illustrated in FIG. 3, the heat pump 600a includes a compressor 610 for compressing refrigerant, a condenser 620 for condensing refrigerant by heat radiation, an expansion apparatus 630 for depressurizing and expanding refrigerant, and an evaporator 640 for allowing refrigerant to absorb surrounding latent heat to evaporate. The compressor 610, the condenser 620, the expansion apparatus 630, and the evaporator 640 are connected by a refrigerant pipe to circulate (flow) refrigerant. The compressor 610 is provided in a machine room 125 disposed below the tub 140 inside the cabinet 120. The evaporator 640 is provided inside the machine room 125. Since the compressor 610 and the evaporator 640 are arranged in the same space, the evaporator 640 may absorb heat energy released from the compressor 610 to promote the evaporation of refrigerant therein. In addition, the compressor 610 may promote cooling due to the latent heat absorption of the evaporator 640, thereby reducing heat load.

Figure 4:
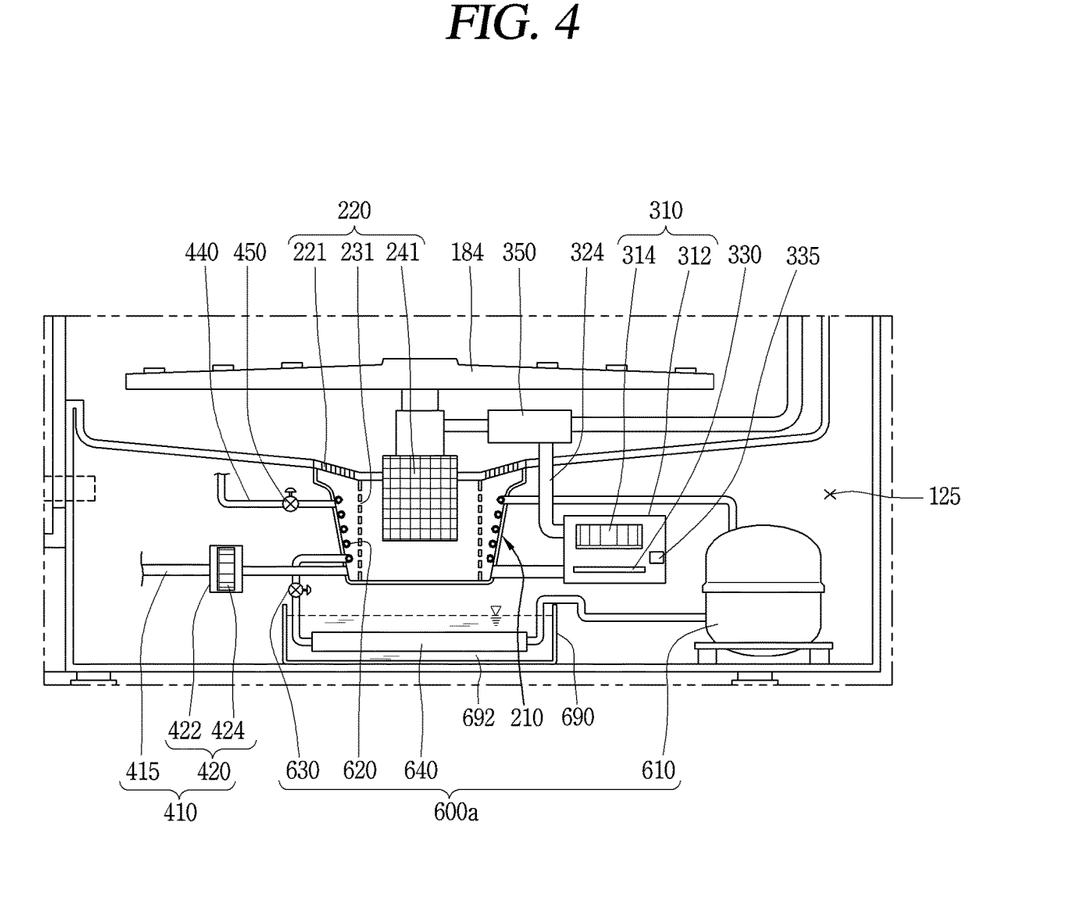
FIGS. 4 through 6 are modified examples of an evaporator in FIG. 2.
Figure 5:
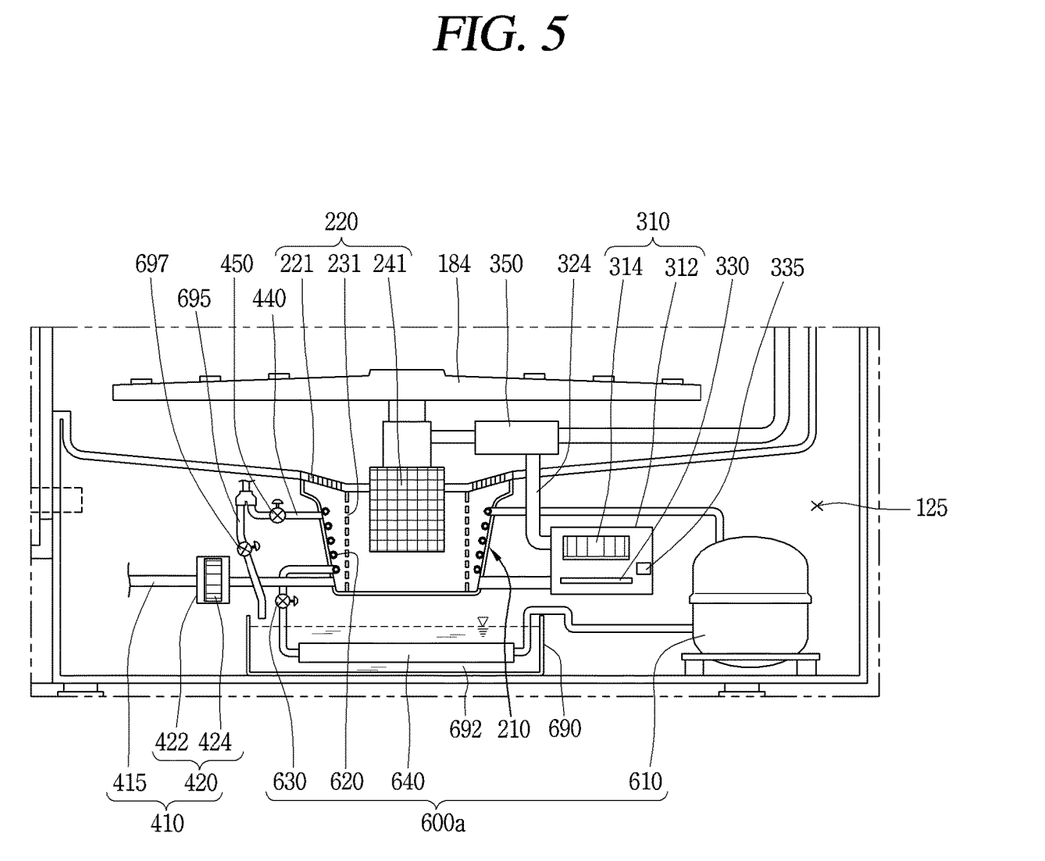
Figure 6:
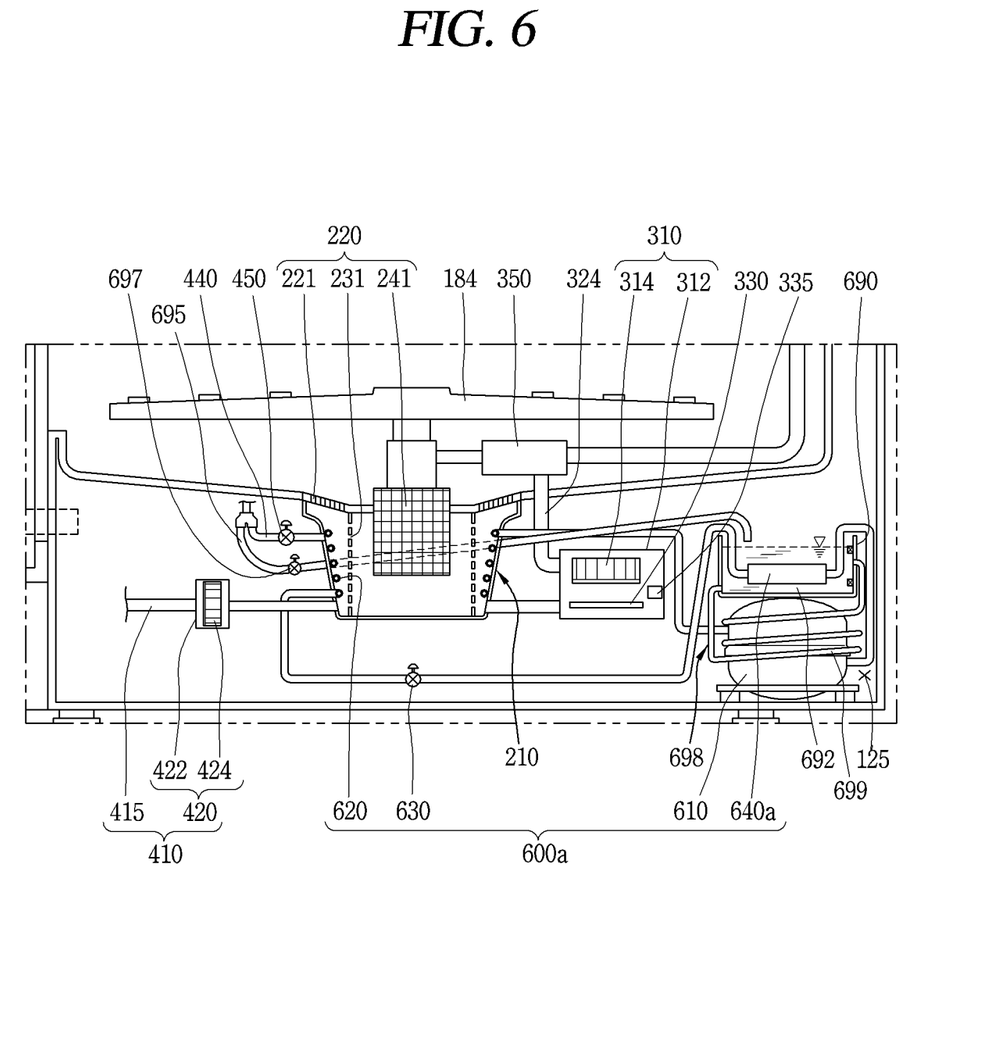

On the other hand, FIGS. 4 through 6 are modified examples of an evaporator in FIG. 2. As illustrated in FIG. 4, the evaporator 640 may be configured to exchange heat with water. A water tank 690 may be provided inside the machine room 125. The water tank 690 may be provided, for example, under the sump 210.

The water tank 690 may be implemented, for example, in an upwardly open cylindrical shape. Water 692 is provided inside the water tank 690. The evaporator 640 is accommodated in the water tank 690 so as to exchange heat with the water 692. According to such a configuration, the latent heat absorption of the evaporator 640 may be facilitated when the heat pump 600*a* is driven.

As illustrated in FIG. 5, the water tank 690 may be provided with a water level sensing unit 693 for sensing a level of the water 692. The water level sensing unit 693 may include, for example, a lower sensing unit 694*a* and an upper sensing unit 694*b* spaced apart from each other in a vertical direction of the water tank 690. The water tank 690 may be provided with a water supply pipe 695 for supplying water into the water tank 690. The water supply pipe 695 may be branched from, for example, the connection pipe 440. The water pipe 695 may be provided with a water pipe valve 697 that opens and closes an internal passage. According to such a configuration, water supply inside the water tank 690 may be controlled based on the water level sensing result of the water level sensing unit 693. More specifically, when a low water level is sensed by the lower sensing unit 694*a*, the water supply pipe valve 697 may be opened to supply water to the water tank 690. When a high water level is sensed by the upper sensing unit 694*b*, the water supply pipe valve 697 may be blocked to stop water supply to the water tank 690.

As illustrated in FIG. 6, the water tank 690 may be configured to exchange heat with the compressor 610. The water tank 690 may be disposed, for example, above the compressor 610. As a result, the temperature of the water tank 690 (water) may be increased by heat energy released from the compressor 610. The water tank 690 may be provided with a heat transfer member 698 for transferring the heat energy of the compressor 610. The heat transfer member 698 may be configured to exchange heat with the compressor 610 on one side thereof and heat exchange with the water tank 690 on the other side thereof.

The heat transfer member 698 may be implemented as, for example, a heat transfer pipe through which water is circulated. The heat transfer member 698 may be made of a metal member (for example, copper (CU) or aluminum (Al)). One end of the heat transfer member 698 is connected to communicate with one side of the water tank 690 and the other end thereof is disposed to be heat-exchanged to an outer surface of the compressor 610, and then connected to communicate with the other side of the water tank 690. The heat transfer member 698 may include a heat exchange unit 699 configured to exchange heat on a circumferential surface of the compressor 610. Here, both ends of the heat transfer member 698 may be connected to communicate with a height difference along a vertical direction of the water tank 690. In this configuration, when the compressor 610 is driven, the water 692 inside the heat exchange part 699 is heat-exchanged with the compressor 610 to raise the temperature and move upward by the convection phenomenon. By flowing into the interior of the 690, the water 692 inside the water tank 690 may be circulated and heated. In some examples, the heat exchange part 699 may be a portion of a pipe that circulates water to the water tank 690.

On the other hand, the heat transfer member 698, although not specifically shown in the drawing, for example, may have a rod shape of a metal member, and one end thereof may be brought into contact with the compressor 610 to exchange heat and the other end thereof may be configured to exchange heat with the water tank 690 (water). Accordingly, heat energy on a surface of the compressor 610 having a relatively high temperature may be transmitted to the water tank 690 through the heat transfer member 698 during the operation of the compressor 610.

Figure 7:
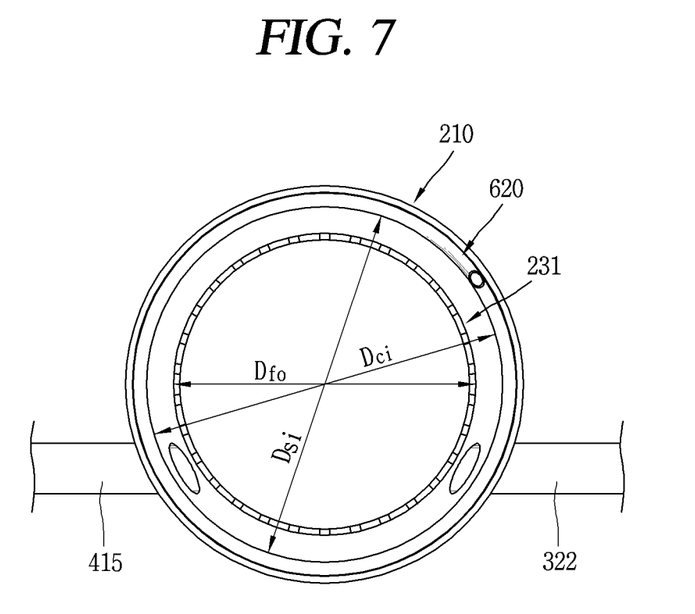
FIG. 7 is a cross-sectional view taken along line VII-VII in FIG. 2.
Figure 8:
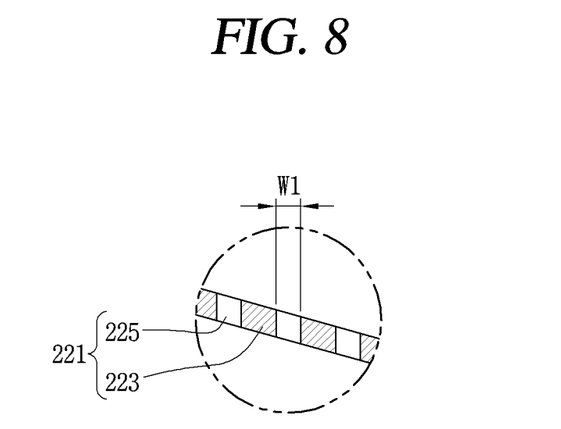
FIG. 8 is a partially enlarged view of a first filter in FIG. 2.
Figure 9:
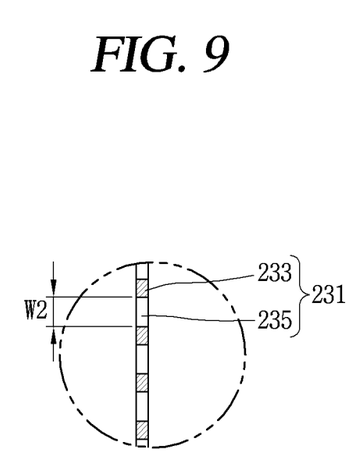
FIG. 9 is a partially enlarged view of a second filter in FIG. 2.
Figure 10:
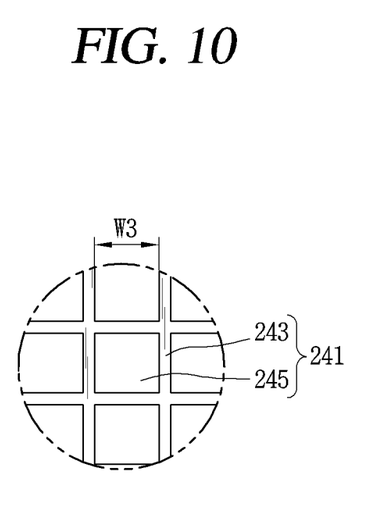
FIG. 10 is a partially enlarged view of a third filter in FIG. 2.

FIG. 7 is a cross-sectional view taken along line VII-VII in FIG. 2, and FIG. 8 is a partially enlarged view of a first filter in FIG. 2, and FIG. 9 is a partially enlarged view of a second filter in FIG. 2, and FIG. 10 is a partially enlarged view of a third filter in FIG. 2.

As illustrated in FIG. 7, the condenser 620 is provided inside the sump 210. Here, the condenser 620 may be referred to as a sump condenser since the condenser 620 is provided inside the sump 210. The condenser 620 is configured to be in direct contact with washing water inside the sump 210. As a result, it may be possible to suppress energy loss from being generated while heating the washing water. In addition, the heating time of the washing water may be shortened. The condenser 620 is implemented in a spiral shape. The condenser 620 is configured to increase the coil diameter toward the upper side to correspond to an inner surface shape of the sump 210 (see FIG. 2). The sump 210 is provided with a filter 220 for suppressing the movement of contaminants in washing water. The filter 220 includes a first filter 221 installed to block the upper opening of the sump 210. A second filter 231 is provided below the first filter 221. The second filter 231 has a cylindrical shape. The second filter 231 is configured to be spaced apart from an inner surface of the sump 210 by a predetermined distance. A third filter 241 is provided inside the second filter 231. The third filter 241 has a cylindrical shape.

For example, as illustrated in FIG. 8, the first filter 221 includes a through hole 225 having a predetermined size (W1) to suppress the passage of contaminants and allow washing water to pass therethrough. The first filter 221 is configured with a disk-shaped first filter body 223 having a size capable of blocking an upper opening of the sump 210 and a plurality of through holes 225 disposed through the first filter body 223, for example.

The second filter 231 includes a second filter body 233 formed in a cylindrical shape to have a mesh member having a mesh 235 structure. The second filter 231 has a smaller outer diameter (Lfo) than a minimum inner diameter (Lsimin) of the sump 210. The second filter 231 has a smaller outer diameter (Lfo) than a minimum inner diameter (Lcimin) of the condenser 620. A lower end of the second filter 231 is disposed below the bottom of the condenser 620. A lower end of the second filter 231 is disposed to be brought into contact with a bottom surface of the sump 210.

As illustrated in FIG. 9, the second filter 231 includes a mesh 235 having a predetermined size (W2). The size (W2) of the mesh 235 of the second filter 231 is smaller than the size (W1) of the through hole 225 of the first filter 221. As a result, contaminants larger than the size of the mesh 235 of the second filter 231 among the contaminants that have passed through the first filter 221 are collected in the second filter 231.

The third filter 241 is implemented by having, for example, a substantially cylindrical third filter body 243 and a plurality of through portions 245 disposed through the third filter body 243 in a lattice shape. As illustrated in FIG. 10, the plurality of through portions 245 have a preset size (W3). The size (W3) of the plurality of through portions 245 is defined to be larger than the size (W1) of the through hole 225 of the first filter 221. As a result, the largest contaminants among the contaminants included in washing water is collected in the third filter 241. Contaminants having the next size that have passed through the plurality of through portions 245 are collected in the second filter 231. Contaminants smaller than the size of the mesh 235 of the second filter 231 are circulated by the circulation pump 310, and discharged to the outside when the drain pump 420 is drained.

Figure 11:
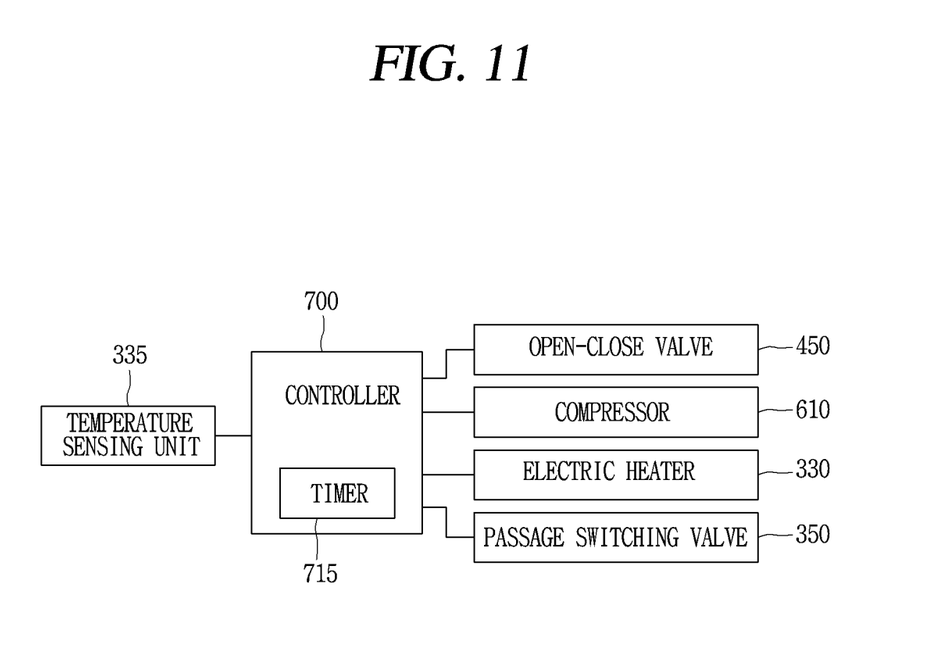
FIG. 11 is a control block diagram of the dishwasher in FIG. 1.

FIG. 11 is a control block diagram of the dishwasher in FIG. 1. As illustrated in FIG. 11, a dishwasher having a heat pump according to the present embodiment is configured to include a controller 700 implemented as a microprocessor provided with a control program. A temperature sensing units 335 for sensing the temperature of washing water is connected to the controller 700 in a communicable manner. The open-close valve 450 is controllably connected to the controller 700 so as to control the supply of washing water in the sump 210. The heat pump 600a (compressor 610) is controllably connected to the controller 700 so as to control the temperature of the washing water. The controller 700 is controllably connected to the electric heater 330 for heating washing water to control the temperature of the washing water. The controller 700 is configured to control the compressor 610 to be driven when the washing water of the sump 210 is to be heated. On the other hand, when the temperature of the washing water of the sump 210 after heating the washing water of the sump 210 by driving the compressor 610 for a preset period of time is less than a preset temperature, for example, the controller 700 may be configured to control power to be applied to the electric heater 330. The controller 700 includes a timer 715 for calculating an operation time of the compressor 610.

By this configuration, the controller 700 controls the open-close valve 450 to supply washing water to the sump 210 so as to open the passage of the connection pipe 440. The controller 700 controls the open-close valve 450 to block the connection pipe 440 when a predetermined amount of water is supplied into the sump 210. The controller 700 may control the circulation pump 310 to allow the washing water of the sump 210 to be circulated. The controller 700 may control the passage switching valve 350 according to a preset washing course to distribute washing water to the respective spray arms.

On the other hand, the controller 700 controls the compressor 610 of the heat pump 600a to be driven when washing water inside the tub 140 is to be heated. Refrigerant compressed by driving the compressor 610 is moved to the condenser 620. The refrigerant moved to the condenser 620 is heat-exchanged with washing water inside the sump 210 to release heat and then condensed. The refrigerant that has passed through the condenser 620 is depressurized and expanded while passing through the expansion apparatus 630. The depressurized and expanded refrigerant is moved to the evaporator 640. The refrigerant moved to the evaporator 640 is evaporated by absorbing surrounding latent heat. At this time, the evaporator 640 absorbs heat energy released from the compressor 610 to easily evaporate refrigerant therein. In addition, since the ambient temperature is relatively low due to the latent heat absorption of the evaporator 640, the compressor 610 promotes cooling to reduce heat load. As a result, the operating efficiency of the heat pump 600a is improved.

The controller 700 senses the temperature of the washing water by the temperature sensing unit 335 when a preset period of time elapses subsequent to driving the compressor 610. When the temperature of washing water sensed by the temperature sensing unit 335 is less than a preset temperature, power may be controlled to be applied to the electric heater 330. The controller 700 may control the operation of the electric heater 330 and the compressor 610 to be stopped when the temperature of the washing water reaches the set temperature.

Hereinafter, another embodiment of the present disclosure will be described with reference to FIGS. 12 through 14.

Figure 12:
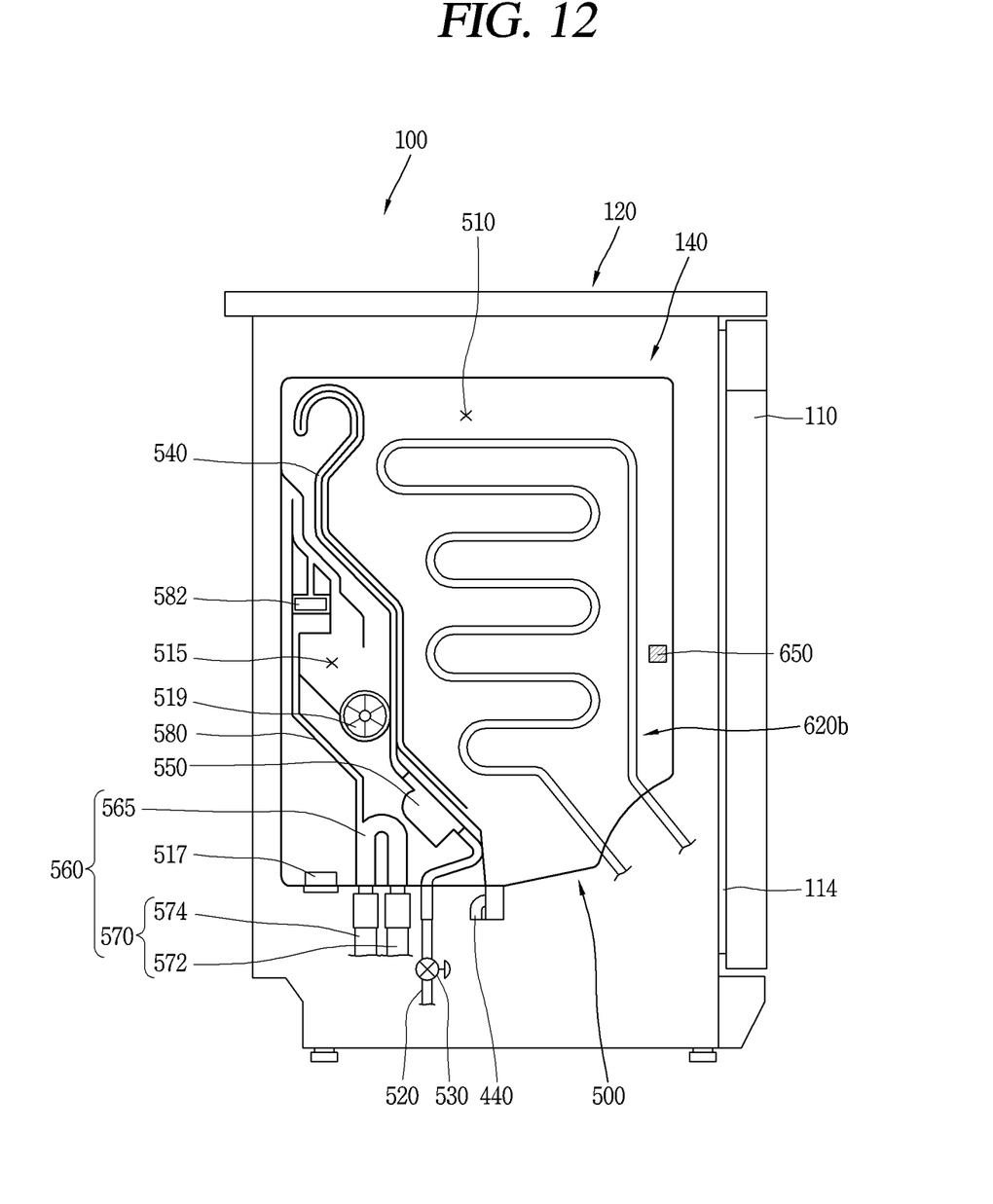
FIG. 12 is a cross-sectional view of a water jacket region of a dishwasher having a heat pump according to another embodiment of the present disclosure.
Figure 13:
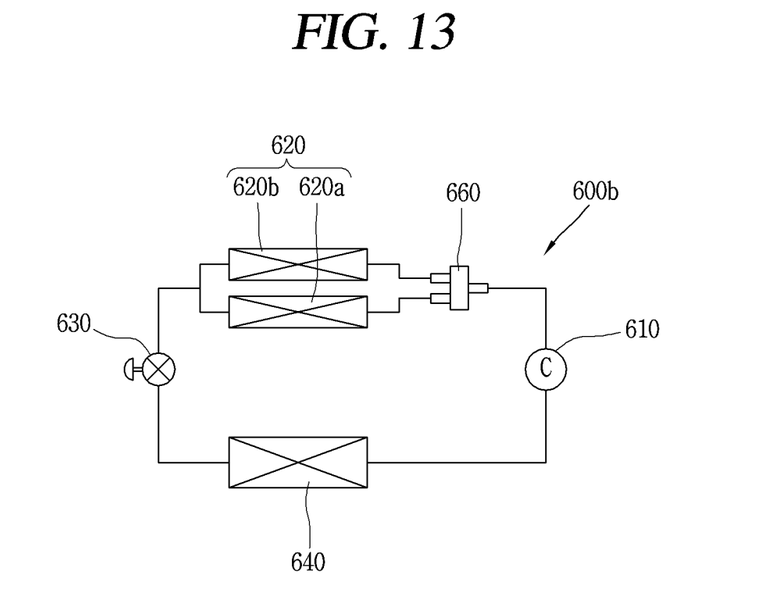
FIG. 13 is a cycle diagram of the dishwasher in FIG. 12.
Figure 14:
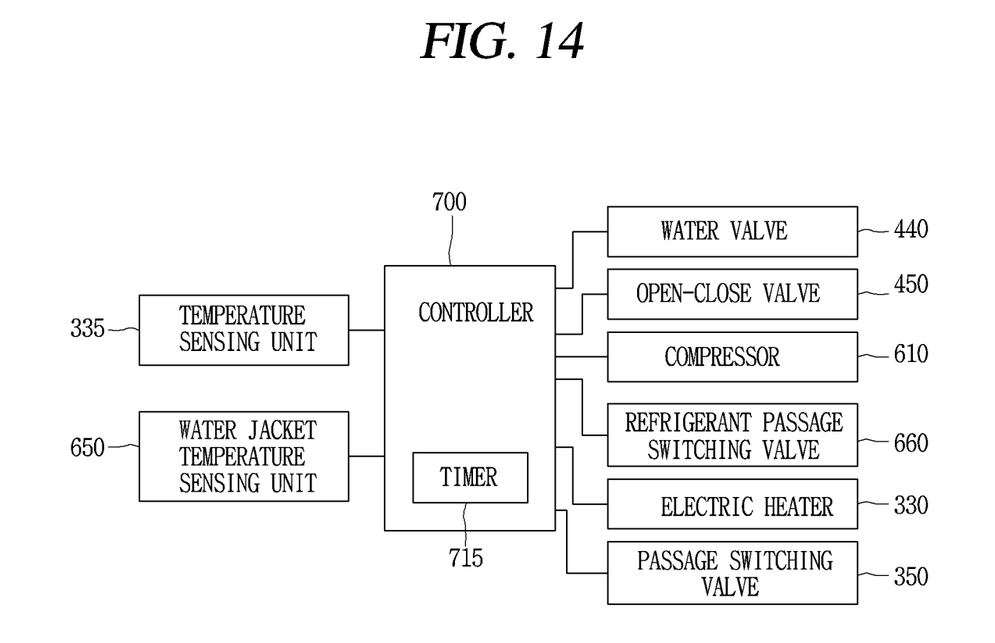
FIG. 14 is a control block diagram of the dishwasher in FIG. 12.

FIG. 12 is a cross-sectional view of a water jacket region of a dishwasher having a heat pump according to another embodiment of the present disclosure, and FIG. 13 is a cycle diagram of the dishwasher in FIG. 12, and FIG. 14 is a control block diagram of the dishwasher in FIG. 12. As described above, a dishwasher according to the present embodiment includes a dishwasher body 100 having a tub 140 configured with a washing space 142 therein and a sump 210 provided at a bottom of the tub 140 to temporarily accommodate washing water; a heat pump 600b having a compressor 610, an evaporator 640, an expansion apparatus 630, and a condenser 620 installed in direct contact with washing water to directly heat the washing water; and a controller 700 configured to control the heat pump 600b to increase the temperature of washing water inside the sump 210.

Here, the condenser 620 includes a sump condenser 620a provided inside the sump 210 so as to directly heat washing water inside the sump 210 and a water jacket condenser 620 provided inside a water jacket 500 to directly heat washing water inside the water jacket 500 which will be described later.

As described above, the cabinet 120 is provided outside the tub 140. The rack 160 for accommodating dishes is installed inside the tub 140. The rack 160 includes an upper rack 162, a lower rack 164, and a top rack 166. An inside of the tub 140 is provided with a spray arm 180 for spraying washing water. The spray arm 180 has an upper spray arm 182, a lower spray arm 184, and a top spray arm 186. A sump 210 is provided at the bottom of the tub 140.

One side of the sump 210 is connected to a circulation pump 310. The other side of the sump 210 is connected to a drain unit 410. The drain unit 410 includes a drain passage 415 and a drain pump 420. The other side of the sump 210 is connected to a connection pipe 440 for supplying washing water. The connection pipe 440 is provided with an open-close valve 450 that opens and closes the passage. A sump condenser 620a is provided inside the sump 210 to heat washing water inside the sump 210.

On the other hand, the dishwasher body 100 is provided with a water jacket 500 for storing washing water. The water jacket 500 is provided on, for example, one sidewall of the dishwasher body 100. The water jacket 500 is provided on the left sidewall of the dishwasher body 100. More specifically, the water jacket 500 is inserted into a space between the left sidewall of the cabinet 120 and the left sidewall of the tub 140.

As illustrated in FIG. 12, the water jacket 500 is provided with a washing water storage unit 510 for storing washing water at an inner one side. A lower one side of the water jacket 500 is provided with a water pipe 520 into which washing water flows. The water pipe 520 is provided with a water valve 530 that opens and closes a water passage. One side of the water pipe 520 is provided with a connection pipe 440 connected to move the washing water of the washing water storage unit 510 to be moved to the sump 210. An inflow passage 540 is connected to the water pipe 520 to allow washing water to flow into the washing water storage unit 510. The inflow passage 540 is extended upward to horizontally partition an inner space of the water jacket 500. The inner space of the water jacket 500 is partitioned into the washing water storage unit 510 and a condensation space 515 by the inflow passage 540. The inflow passage 540 is provided with a flow meter 550 to sense a flow rate of washing water.

One side of the water jacket 500 is provided with a discharge passage 560 for discharging washing water. The drain passage 415 includes the discharge passage 560. The discharge passage 560 is disposed in the condensation space 515. The discharge passage 560 includes, for example, a drain connection portion 565 having an inverted "U" shape and a drain pipe 570 connected to the drain connection portion 565. The drain pipe 570 includes a first drain pipe 572 having one end thereof connected to the drain pump 420 and a second drain pipe 574 having one end thereof extended to the outside.

The condensation space 515 is provided with a ventilation portion 517. The ventilation portion 517 is implemented to communicate with the outside. As a result, the condensation space 515 communicates with an outside of the condensation space 515. A communication hole 519 is provided above the ventilation portion 517. The communication hole 519 communicates with an inner space of the tub 140. One side of the drain connection portion 565 is provided with a condensate discharge passage 580 to discharge condensate. The condensate discharge passage 580 is connected to the discharge passage 560. The condensate discharge passage 580 is provided with a drain valve 582. The drain valve 582 may be implemented as, for example, a check valve that operates in one direction to block fluid from moving upward and to allow the fluid to move downward.

On the other hand, the water jacket 500 is provided with a water jacket condenser 620*b* to heat the washing water of the water jacket 500 (washing water storage unit 510). The water jacket condenser 620*b* is provided in direct contact with washing water inside the washing water storage unit 510. The washing water storage unit 510 is provided with a water jacket temperature sensing unit 650 for sensing the temperature of washing water.

The dishwasher of the present embodiment includes a heat pump 600*b* to heat washing water. As illustrated in FIG. 13, the heat pump 600*b* includes a compressor 610 for compressing refrigerant, a condenser 620 for condensing refrigerant by heat radiation, an expansion apparatus 630 for depressurizing and expanding refrigerant, and an evaporator 640 for allowing refrigerant to absorb surrounding latent heat to evaporate.

The condenser 620 includes a sump condenser 620*a* for heating the washing water of the sump 210 and a water jacket condenser 620*b* for heating the washing water of the water jacket 500.

The heat pump 600*b* includes a refrigerant passage switching valve 660 for switching a passage of refrigerant. One side of the refrigerant passage switching valve 660 is connected to the compressor 610. Another side of the refrigerant passage switching valve 660 is connected to the sump condenser 620*a*. Still another side of the refrigerant passage switching valve 660 is connected to the water jacket condenser 620*b*. Yet still another side of the refrigerant passage switching valve 660 is connected to the evaporator 640.

As illustrated in FIG. 14, the dishwasher of the present embodiment includes a controller 700. A temperature sensing units 335 for sensing the temperature of the washing water is connected to the controller 700 in a communicable manner. The controller 700 is communicatively connected to the water jacket temperature sensing unit 650 for sensing the temperature of the washing water of the water jacket 500. The controller 700 is provided with a timer 715 for calculating the washing water heating time. A water valve 530 is controllably connected to the controller 700 so as to control an amount of washing water introduced into the washing water storage unit 510. The open-close valve 450 is controllably connected to the controller 700 to control an amount of washing water supplied to the sump 210. The controller 700 is controllably connected to the compressor 610 to heat the washing water. The electric heater 330 for heating the washing water is controllably connected to the controller 700.

On the other hand, the controller 700 is controllably connected to the refrigerant passage switching valve 660 to switch a passage of refrigerant discharged from the compressor 610. The controller 700 is configured to control the passage switching valve 350 to allow refrigerant to flow to the water jacket condenser 620*b* so as to heat washing water stored in the washing water storage unit 510. The controller 700 is configured to control the refrigerant passage switching valve 660 to flow refrigerant to the sump condenser 620*a* so as to heat washing water inside the sump 210.

The controller 700 is configured to control the refrigerant passage switching valve 660 according to a plurality of operation modes. The plurality of operation modes include, for example, a first heating mode in which the washing water of the water jacket 500 is heated by the water jacket condenser 620*b*. The plurality of operation modes include, for example, a second heating mode in which the condensate inside the sump 210 is heated by the sump condenser 620*a*. The plurality of operation modes include, for example, a third heating mode in which the washing water of the water jacket 500 is heated by the water jacket condenser 620*b*, and the washing water of the sump 210 is heated by the sump condenser 620*a*. The plurality of operation modes include, for example, a fourth heating mode in which the washing water of the water jacket 500 is heated by the water jacket condenser 620*b*, and the washing water of the sump 210 is heated by the sump condenser 620*a* as well as the washing water of the sump 210 is heated by the electric heater 330.

The first through fourth heating modes may be selectively included in a washing course preset to heat the washing water.

Some of the washing courses that require the washing water heating is configured to include a first heating mode, when heated washing water is required in the subsequent process. As a result, the heating time of the washing water may be shortened by heating washing water to be used for a subsequent process in advance while performing a washing process.

By this configuration, while performing a washing course including the first heating mode, the controller 700 controls the water valve 530 to supply washing water into the washing water storage unit 510 when heated washing water is required in a subsequent process. When washing water is supplied into the washing water storage unit 510, the controller 700 controls the compressor 610 to be driven so as to heat washing water by the water jacket condenser 620*b*, and controls the refrigerant passage switching valve 660 to switch a passage of the refrigerant. As a result, refrigerant compressed by the compressor 610 is moved to the water jacket condenser 620*b* via the refrigerant passage switching valve 660 to heat washing water inside the washing water storage unit 510. The controller 700 senses the temperature of washing water by the water jacket temperature sensing unit 650 and controls the operation of the compressor 610 to be stopped when a preset temperature is reached.

When a washing course including the second heating mode is performed, the controller 700 controls the open-close valve 450 to be opened so as to supply washing water into the sump 210. When washing water is supplied into the sump 210, the controller 700 controls the compressor 610 to be driven so as to heat washing water by the sump condenser 620*a*, and controls the refrigerant passage switching valve 660 to switch a passage of the refrigerant. Refrigerant compressed by the compressor 610 is moved to the sump condenser 620*a* via the refrigerant passage switching valve 660 to heat washing water inside the sump 210. The controller 700 controls the circulation pump 310 to allow the heated washing water of the sump 210 to be supplied, sprayed and circulated to the respective spray arms 180.

On the other hand, when performing a washing course including the third heating mode or performing a process prior to heating-washing, the controller 700 controls the water valve 530 to supply washing water to the washing water storage unit 510. When water supply is started (completed), the compressor 610 controls the compressor 610 to be driven so as to heat the washing water of the washing water storage unit 510 by the water jacket condenser 620*b*, and controls the refrigerant passage switching valve 660 to switch a passage of the refrigerant. As a result, the washing water of the washing water storage unit 510 of the water jacket 500 may be heated. The controller 700 controls the open-close valve 450 to supply the washing water of the washing water storage unit 510 to the sump 210 when performing a heating-washing process. The controller 700 controls the refrigerant passage switching valve 660 to move the refrigerant to the sump condenser 620*a* when washing water is supplied to the sump 210. The refrigerant moved to the sump condenser 620*a* may additionally heat washing water inside the sump 210 while exchanging heat with washing water inside the sump 210.

The controller 700 performs the process as described in the washing course including the third heating mode when performing a washing course including the fourth heating mode. In addition, when performing a washing course including the fourth heating mode, the controller 700 controls refrigerant compressed by the sump condenser 620*a* to be moved, and controls power to be applied to the electric heater 330. According to this, the heating time of the washing water may be significantly shortened, thereby shortening the overall operating time.

As described above, preferred embodiments of the present invention are illustrated and described herein with reference to the accompanying drawings. However, the present disclosure may be implemented in various embodiments without departing from the concept or gist of the invention, and thus the foregoing embodiments should not be limited to the content of the detailed description.

Furthermore, the foregoing embodiments should be broadly construed within the scope of the technical concept defined by the appended claims even though they are not specifically disclosed in the detailed description herein. Moreover, all changes and modifications within the technical scope of the claims and the equivalent scope thereof should be construed to be included in the appended claims.

What is claimed is:

1. A dishwasher comprising:
   a dishwasher body comprising a tub that defines a washing space therein and a sump that is disposed vertically below the tub and configured to accommodate washing water;
   a heat pump comprising a compressor, an evaporator, an expansion apparatus, and a sump condenser, the sump condenser being disposed inside the sump and configured to exchange heat with washing water in the sump;
   a water jacket disposed at a sidewall of the dishwasher body and configured to store washing water therein;
   a connection pipe configured to supply washing water in the water jacket into the sump;
   a water tank disposed at an upper side of the compressor and configured to receive water; and
   a controller configured to control the heat pump to be driven to thereby increase a temperature of washing water in the sump,
   wherein the heat pump further comprises:
      a water jacket condenser disposed inside the water jacket and configured to be in direct contact with washing water in the water jacket to thereby heat the washing water in the water jacket, and
      a refrigerant passage switching valve having a first end connected to the compressor and second ends connected to the sump condenser and the water jacket condenser, respectively, the refrigerant passage switching valve being configured to switch supply of refrigerant between the sump condenser and the water jacket condenser,
   wherein the controller is configured to, prior to heating washing water in the sump, control the refrigerant passage switching valve to supply refrigerant discharged from the compressor to the water jacket condenser to thereby heat washing water in the water jacket and supply the washing water heated by the water jacket condenser to the sump through the connection pipe,
   wherein the evaporator is disposed at an inside of the water tank and configured to exchange heat with water in the water tank,
   wherein the water jacket comprises an inflow passage that partitions an inner space of the water jacket into a washing water storage and a condensation space, and
   wherein the water jacket condenser is disposed within and passes through the washing water storage of the water jacket to thereby contact washing water in the washing water storage.

2. The dishwasher of claim 1, wherein the sump comprises:
   a first filter that covers an upper opening of the sump; and
   a second filter that is disposed vertically below the first filter in the sump, that is disposed radially inward of the sump condenser, and that is configured to block contaminants moving from an inside of the sump to the sump condenser.

3. The dishwasher of claim 2, wherein the second filter defines an upper aperture, and
   wherein the sump further comprises a third filter that covers at least a portion of the upper aperture of the second filter.

4. The dishwasher of claim 3, wherein the first filter defines a plurality of through holes, and the second filter defines a plurality of meshes, and
   wherein an opening width of each of the plurality of meshes of the second filter is less than an opening width of each of the plurality of through holes of the first filter.

5. The dishwasher of claim 4, wherein the third filter defines a plurality of through portions, and
   wherein an opening width of each of the plurality of through portions of the third filter is greater than the opening width of each of the plurality of through holes of the first filter.

6. The dishwasher of claim 1, further comprising:
   a water pipe connected to the water jacket and configured to supply washing water; and
   a water valve configured to open and close the water pipe,
   wherein the controller is configured to, prior to supplying refrigerant to the water jacket condenser, control the water valve to open the water pipe to thereby supply a predetermined amount of washing water to the water jacket.

7. The dishwasher of claim 6, wherein the water jacket comprises a water jacket temperature sensing unit configured to sense a temperature of washing water in the water jacket, and
   wherein the controller is configured to control the heat pump to stop supplying refrigerant to the water jacket condenser based on the temperature of washing water in the water jacket corresponding to a preset temperature.

8. The dishwasher of claim 1, further comprising:
   an electric heater configured to heat washing water in the sump; and
   a temperature sensing unit configured to sense the temperature of washing water in the sump,
   wherein the controller is configured to:
      compare the temperature of washing water in the sump to a preset temperature based on an elapse of a preset period of time from a reference time point, and
      control the electric heater to generate heat based on the temperature of washing water in the sump being less than the preset temperature.

9. The dishwasher of claim 8, further comprising a circulation pump connected to the sump and configured to circulate washing water in the sump,
   wherein the electric heater and the temperature sensing unit are disposed inside the circulation pump.

10. The dishwasher of claim 1, wherein the dishwasher body defines an inner space that accommodates both of the compressor and the evaporator.

11. The dishwasher of claim 1, further comprising a water pipe connected to the water tank and configured to supply water to the water tank.

12. The dishwasher of claim 11, further comprising:
   a water pipe open-close valve disposed at the water pipe and configured to open and close the water pipe; and
   a water level sensing unit disposed in the water tank and configured to sense a level of water in the water tank,
   wherein the controller is configured to control the water pipe open-close valve based on a sensing result of the water level sensing unit.

13. The dishwasher of claim 12, further comprising a heat transfer pipe disposed between the water tank and the compressor and configured to transfer heat energy of the compressor to the water tank.

14. The dishwasher of claim 13, wherein the heat transfer pipe is configured to receive water from the water tank and circulate the received water to the water tank, and
   wherein a portion of the heat transfer pipe is disposed at a circumferential surface of the compressor and configured to exchange heat with the compressor.

15. The dishwasher of claim 1, wherein the inflow passage extends upward and horizontally partitions the inner space of the water jacket into the washing water storage and the condensation space.

16. The dishwasher of claim 1, wherein the sump condenser is in contact with and extends along an inner surface of the sump that defines an inner diameter of the sump.

17. The dishwasher of claim 1, wherein the sump condenser comprises (i) a first end disposed at a lower side of the sump and connected to the evaporator and (ii) a second end disposed at an upper side of the sump and connected to the compressor.

18. The dishwasher of claim 1, wherein a cross section of the sump has a conical shape having an inner diameter that decreases toward a lower side of the sump, and
   wherein the sump condenser has a spiral shape having a coil diameter that increases toward an upper side of the sump such that the coil diameter corresponds to the inner diameter of the sump.

19. The dishwasher of claim 1, wherein the water tank is configured to receive heat transferred from the compressor by convection.

* * * * *